United States Patent
Duan et al.

(10) Patent No.: US 10,228,254 B2
(45) Date of Patent: *Mar. 12, 2019

(54) VERIFYING A ROAD NETWORK OF A MAP

(71) Applicant: International Business Machines Corporation, Armonk, NY (US)

(72) Inventors: Ning Duan, Beijing (CN); Peng Gao, Beijing (CN); Baohua Wang, Beijing (CN); Xin Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/182,660

(22) Filed: Jun. 15, 2016

(65) Prior Publication Data

US 2016/0290813 A1    Oct. 6, 2016

Related U.S. Application Data

(63) Continuation of application No. 14/738,974, filed on Jun. 15, 2015, now Pat. No. 9,404,757.

(30) Foreign Application Priority Data

Jun. 27, 2014   (CN) .......................... 2014 1 0302426

(51) Int. Cl.
  *G01C 21/32*   (2006.01)
  *G01C 21/30*   (2006.01)
  (Continued)

(52) U.S. Cl.
  CPC ............ *G01C 21/32* (2013.01); *G01C 21/20* (2013.01); *G01C 21/26* (2013.01); *G01C 21/30* (2013.01); *G01C 21/34* (2013.01); *G01C 21/3667* (2013.01)

(58) Field of Classification Search
  CPC ................................ G01C 21/32; G01C 21/30
  See application file for complete search history.

(56) References Cited

U.S. PATENT DOCUMENTS 7,024,307 B2   4/2006   Ito et al.
8,271,190 B2   9/2012   Smartt
(Continued)

FOREIGN PATENT DOCUMENTS

CN   101520331 A   9/2009
CN   101842662 A   9/2010
(Continued)

OTHER PUBLICATIONS

Ding, et al., Pending U.S. Appl. No. 15/441,285, filed Feb. 24, 2017, titled "Generating a Road Network From Location Data", pp. 1-31.
(Continued)

*Primary Examiner* — Alex C Dunn
(74) *Attorney, Agent, or Firm* — Michael O'Keefe

(57) ABSTRACT

The present disclosure relates to a computer implemented method, a computer program product, and a computer system for verifying the road network of map. An embodiment of the present invention provides a method for verifying a road network of a map. The method comprises: determining, based on locations of a set of points in the map, a trajectory distance of a trajectory between a start point and an end point in the set of points on the map; determining a route distance between the start point and the end point in the road network of the map; and verifying the road network by comparing the trajectory distance and the route distance.

18 Claims, 5 Drawing Sheets

(51) Int. Cl.
*G01C 21/36* (2006.01)
*G01C 21/34* (2006.01)
*G01C 21/20* (2006.01)
*G01C 21/26* (2006.01)

(56) References Cited

U.S. PATENT DOCUMENTS

| | | | |
|---|---|---|---|
| 8,396,660 B2 | 3/2013 | Takahata et al. | |
| 8,463,542 B2 | 6/2013 | Pfeiffer et al. | |
| 8,566,021 B2 | 10/2013 | Smartt | |
| 8,825,359 B1* | 9/2014 | Wolf | G01C 21/32 340/907 |
| 2007/0191029 A1 | 8/2007 | Zarem et al. | |
| 2009/0138188 A1* | 5/2009 | Kores | G01C 21/32 701/117 |
| 2013/0332476 A1 | 12/2013 | Sinha et al. | |
| 2014/0163872 A1 | 6/2014 | Schilling et al. | |
| 2015/0198449 A1* | 7/2015 | Okude | G01C 21/3492 701/408 |
| 2015/0300835 A1* | 10/2015 | Fowe | G01C 21/20 701/410 |
| 2015/0377629 A1 | 12/2015 | Duan et al. | |
| 2015/0377636 A1 | 12/2015 | Ding et al. | |

FOREIGN PATENT DOCUMENTS

| | | |
|---|---|---|
| CN | 101464158 B | 4/2011 |
| CN | 102436469 A | 5/2012 |
| CN | 102713521 A | 10/2012 |
| CN | 103309888 A | 9/2013 |
| CN | 103499828 A | 1/2014 |
| EP | 2455714 A1 | 5/2012 |
| WO | 2010105712 A1 | 9/2010 |
| WO | 2011023245 A1 | 3/2011 |
| WO | 2012089271 A1 | 7/2012 |
| WO | 2014024773 A1 | 2/2014 |

OTHER PUBLICATIONS

Pending application No. 201410302426.2, filed on Jun. 27, 2014, entitled; "Verifying Road Network of Map", 27 pages.
Pending application No. 201410302599.4, filed on Jun. 27, 2014, entitled: "Generating Road Network", 29 pages.
Garcia et al., "Gap Detection in Road Networks", UCLA Department of Mathematics, http://www.math.ucla.edu/~wittman/reu2008/Reports/road_report.pdf, Aug. 8, 2008, pp. 1-18.
Luan et al., "Generating Strokes of Road Networks Based on Pattern Recognition", 13th ICA Workshop on Generalisation and Multiple Representation, Sep. 12-13, 2010, Zurich, Switzerland, http://www.researchgate.net/publication/228562636_Generating_Strokes_of_Road_Networks_Based_on_Pattern_Recognition, pp. 1-8.
Butenuth, "Geometric Refinement of Road Networks Using Network Snakes and SAR Images", http://geodesy.unr.edu/hanspeterplag/library/IGARSS2010/pdfs/1864.pdf, 2010, pp. 1-4.
Pending U.S. Appl. No. 15/176,343, filed Jun. 8, 2016, entitled: "Verifying a Road Network of a Map", 30 pages.
IBM: List of IBM Patents or Patent Applications Treated As Related (Appendix P), Dated Aug. 3, 2016 , 2 pages.
Pending U.S. Appl. No. 15/185,085, filed Jun. 17, 2016, entitled: "Verifying a Road Network of a Map", 34 pages.
Pending U.S. Appl. No. 15/203,858, filed Jul. 7, 2016, entitled: "Verifying a Road Network of a Map", 33 pages.
Pending U.S. Appl. No. 15/221,751, filed Jul. 28, 2016, entitled: "Verifying a Road Network of a Map", 32 pages.
Pending U.S. Appl. No. 15/221,800, filed Jul. 28, 2016, entitled: "Verifying a Road Network of a Map", 32 pages.
Pending US Application No. 15/222,071, filed Jul. 28, 2016, entitled: "Verifying a Road Network of a Map", 31 pages.
Pending U.S. Appl. No. 15/223,036, filed Jul. 29, 2016, entitled: "Verifying a Road Network of a Map", 30 pages.

* cited by examiner

VERIFYING A ROAD NETWORK OF A MAP

BACKGROUND

The present invention generally relates to a computer implemented method, a computer program product, and a computer system for verifying a road network of a map, and more specifically to continuously improving the road network of a map.

In various fields such as connected vehicle, intelligent transportation or location-based service (LBS), a map provides fundamental information to support other services. In particular, a road network of a map may be used to provide information regarding roads and traffic lines. Currently, the quality of free maps is rather poor. Traditionally, users have to pay for high-quality road network data (purchased in data lump, or purchased by use time), which restricts common users use of a road network.

It has been proposed to generate a road network using location data collected by the positioning systems of vehicles or mobile devices. Meanwhile, some non-commercial third-party map providers also provide road network services. However, a common problem for these road networks lies in low accuracy. Due to restrictions in various aspects such as device, cost, policy, data collection, road network generation for a free map may have limited accuracy. Therefore, the road network data of many currently available maps may be problematic. Two most common road network errors are road segment missing error and road segment connectivity error. A road segment missing error means a route in the real world is not correctly reflected on the map, while a road segment connectivity error means connectivity between road segments on the map has a deviation from the actual roads. The road network in the map may also have other types of errors.

Inaccurate road network may cause inconvenience to a user. For example, if one or more road segments indicated in the road network do not exist, the user would have to reselect a route during traveling, which not only wastes the user's time, but also might cause a traffic problem, or a security risk. On the contrary, if a road segment existing in the real world is not reflected in the road network, it likely wastes the user's time and resources, and the user has to modify their route.

SUMMARY

In general, embodiments of the present invention provide a technical solution for verifying a road network of a map.

In an aspect, an embodiment of the present invention provides a method for verifying a road network of a map. The method includes determining, based on locations of a set of points in the map, a trajectory distance of a trajectory between a start point and an end point in the set of points on the map; determining a route distance between the start point and the end point in the road network of the map; and verifying the road network by comparing the trajectory distance and the route distance.

In another aspect, an embodiment of the present invention provides a system for verifying a road network of a map. The system includes a trajectory distance determining unit configured to determine, based on locations of a set of points in the map, a trajectory distance of a trajectory between a start point and an end point in the set of points on the map; a route path determining unit configured to determine a route distance between the start point and the end point in the road network of the map; and a road network verifying unit configured to verify the road network by comparing the trajectory distance and the route distance.

According to an embodiment of the present invention, a plurality of continuous locations in a moving trajectory of a vehicle or a user are mapped to a set of points on the map. A distance between two points may be determined based on distribution locations on points in the set of points. Meanwhile, a route path between the two points may be determined based on map-based road network information. By appropriately computing a deviation between the road network information and the actual trajectory information based on the two distances, a potential error in the road network may be effectively identified. Other features and advantages of the present invention may become easily comprehensible through the description infra.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

In respective figures, same or like reference numerals are used to represent the same or like components.

DETAILED DESCRIPTION

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
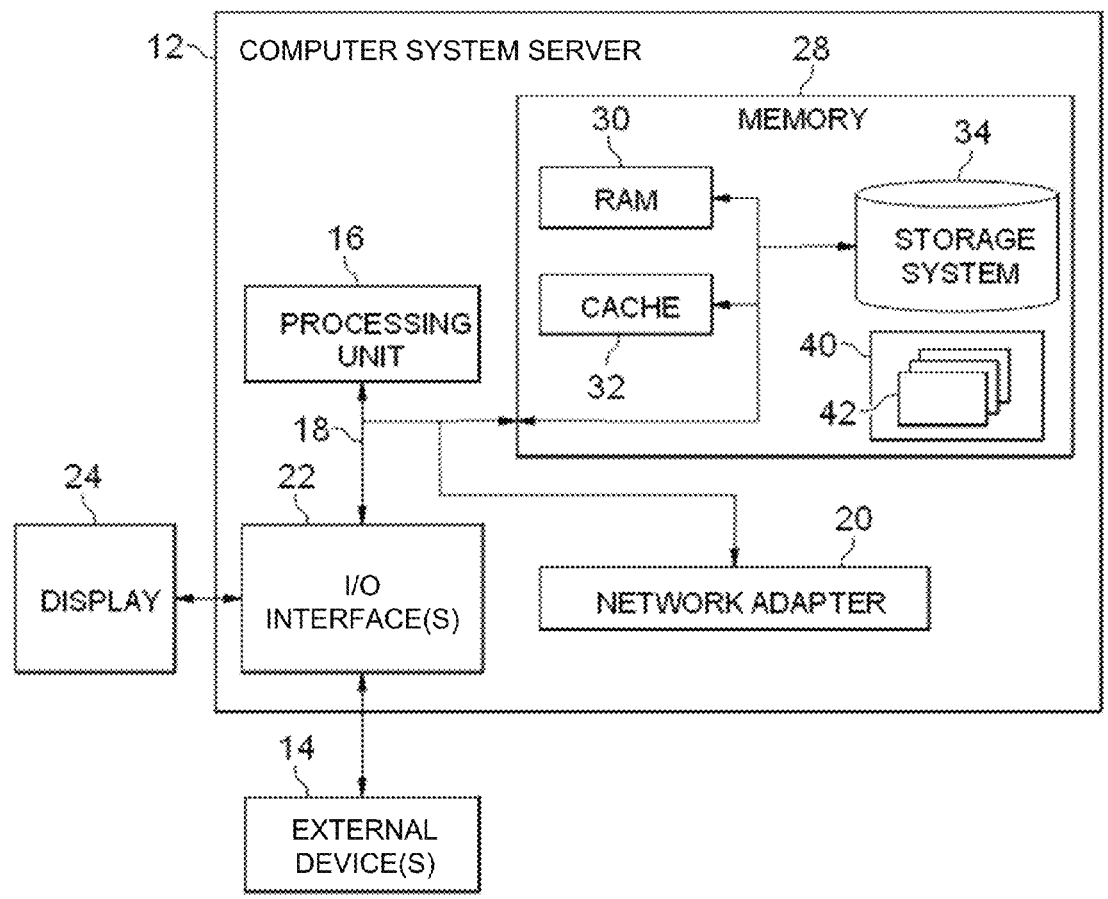
FIG. 1 shows an exemplary computer system/server which is applicable to implement an embodiment of the present invention.

Referring now to FIG. 1, in which an exemplary computer system/server 12 which is applicable to implement an embodiment of the present invention is shown. Computer system/server 12 is only illustrative and is not intended to suggest any limitation as to the scope of use or functionality of embodiments of the invention described herein.

As shown in FIG. 1, a computer system/server 12 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by the computer system/server 12, and may include both volatile and non-volatile media, removable and non-removable media.

The system memory 28 may include computer system readable media in the form of volatile memory, such as random access memory (RAM) 30 and/or cache memory 32. The computer system/server 12 may further include other removable/non-removable, volatile/non-volatile computer system storage media. By way of example only, a storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of a program module 42, may be stored in the system memory 28 by way of example, and not limitation, as well as an operating system, one or more application programs, other program modules, and program data. Each of the operating systems, one or more application programs, other program modules, and program data or some combination thereof, may include an implementation of a networking environment. The program modules 42 generally carries out the functions and/or methodologies of an embodiment of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via an Input/Output (I/O) interface 22. Still yet, the computer system/server 12 can communicate with one or more networks such as a local area network (LAN), a general wide area network (WAN), and/or a public network (e.g., the Internet) via a network adapter 20. As depicted, the network adapter 20 communicates with the other components of the computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Hereinafter, the mechanism and principle of an embodiment of the present invention will be described in detail. Unless otherwise stated, the term "based on" used hereinafter and in the claims expresses "at least partially based on." The term "comprise" or "include" or a similar expression indicates an open inclusion, i.e., "including, but not limited to . . . " The term "plural" or a similar expression indicates "two or more." The term "one embodiment" indicates "at least one embodiment." The term "another embodiment" indicates "at least one another embodiment." Definitions of other terms will be provided in the description infra.

Figure 2:
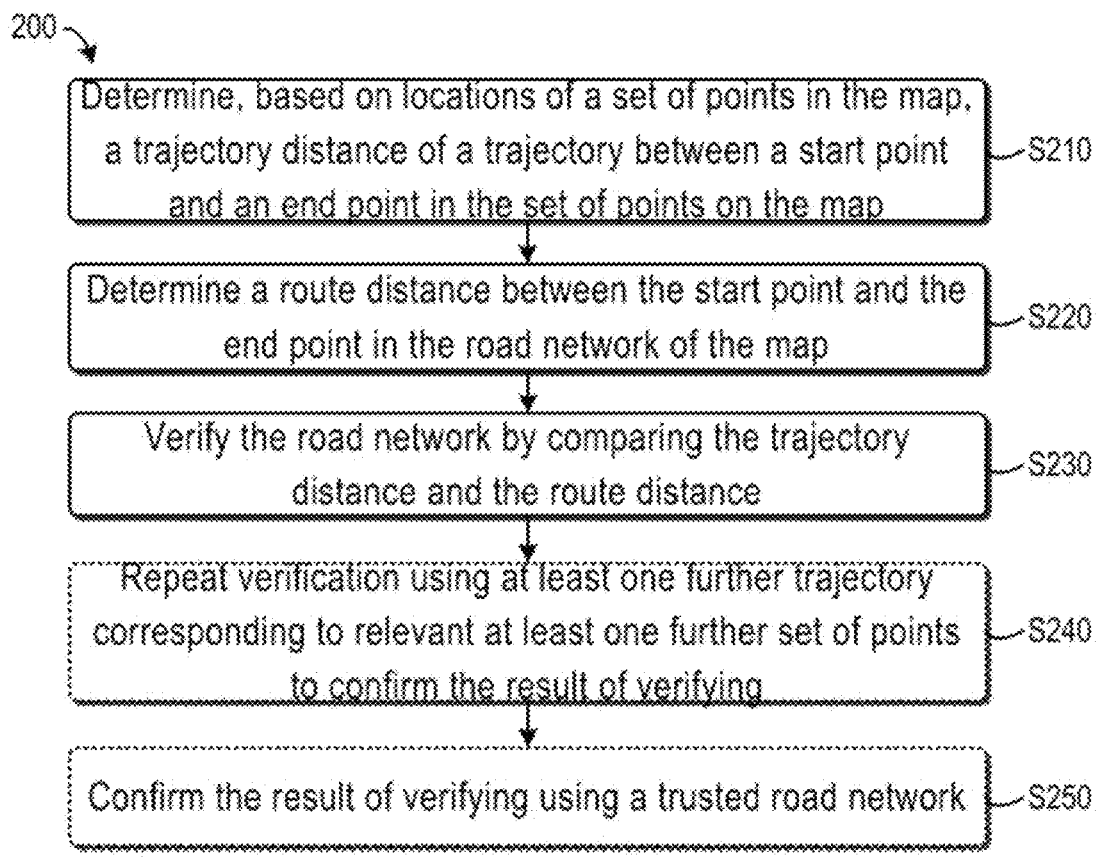
FIG. 2 shows a schematic flow diagram of a method for verifying a road network of a map according to an embodiment of the present invention.

FIG. 2 shows a flow diagram of a method 200 for verifying a road network of a map according to an embodiment of the present invention. The method 200 begins at step S210, where a distance of a trajectory between a starting point and an end point in the set of points is determined based on locations of a set of points on the map. For the convenience of discussion, the distance is called the "trajectory distance."

According to an embodiment of the present invention, the points in a set of points processed at step s210 correspond to a trajectory. Such set of points can be obtained in various manners. For example, in an embodiment, the set of points are obtained by mapping a group of locations as sensed onto a map to be verified. The group of locations may be sensed by any appropriate positioning technique. For example, in an embodiment, the location data of the set of points on the trajectory may be collected continuously or periodically during travel of a vehicle or a user using a positioning device equipped on the vehicle or on the mobile device of the user. Examples of the positioning devices include, but not limited to, at least one of the following: a GPS (global positioning system) receiver, a Galileo positioning system receiver, a Beidou positioning system receiver, etc. In an embodiment, location data of the respective points in the trajectory may be collected by the same vehicle or user. Alternatively, in another embodiment, location data collected by multiple vehicles and/or users may also be used to form the trajectory.

The location data may be mapped to the map by coordinate transformation. In particular, in an embodiment, these locations may be mapped to points on the map using a map matching technology. As known, the match matching technology may match each mapped point to a particular road segment in the network. Moreover, the map matching technology may provide a match degree between the matched respective point and the corresponding road segment. During the process of performing road matching, additional processing such as abnormality processing, bug correction and/or noise cancellation may be performed. Various aspects of the map matching technology are known, which will not be detailed here to avoid confusion with the present invention.

By mapping a plurality of locations in the trajectory to the map, a plurality of points on the map are obtained. In an embodiment, in order to comprehensively verify an accuracy of the road network, a universal set of points on the map may be processed. Alternatively, a subset of points may be selected from among the universal set of points on the map for processing. In other words, the set of points processed at step S210 may be a particular subset of the universal set of points corresponding to the complete trajectory.

According to an embodiment of the present invention, a set of points for processing at step S210 is selected in various appropriate manners. For example, in an embodiment, after locations in the trajectory are mapped to the map, unstable points among the set of points may be located. As an example, in an embodiment of using map matching, a match degree between a point and a segment can be used as a criterion for measuring the stability of the point. In other words, a point whose match degree is lower than a predetermined threshold may be determined as an unstable point. After an unstable point is determined, forward and backward search may be performed along the trajectory, to find stable points located before and after the unstable point, i.e., points whose match degree are greater than the predetermined threshold. In this way, all points between the two stable points may be selected for processing at step S210.

It should be understood that the manner of selecting a set of points described above is only exemplary, not intended to limit the scope of the present invention. In an alternative embodiment, a set of points to be processed within the universal set of points corresponding to the trajectory may also be selected in any other appropriate manner. For example, the set of points to be processed can be randomly selected, or even designated by the user, etc.

For the convenience of discussion, in the context of the present disclosure, a first point in the set of points being processed at step S210 is called "start point," while the last point in the set of points is called "end point." In this way, at step S210, the set of points being processed form a trajectory between a start point and an end point on the map. It should be understood that the start point and the end point are only named relative to the set of points being processed or to the trajectory. In other words, before the processed start point and/or after the processed end point, there may be one or more points indicating other locations.

At step S210, dependent on different purposes of map verification, the trajectory distance between the start point and the end point may be determined in a variety of different manners. For example, in one embodiment, the trajectory distance may be a length of a route matching the trajectory between the start point and the end point on the map. The term "route" used here refers to a continuous line including one or more road segments. As an example, as mentioned above, the set of points may be generated using a map matching technology. In this way, each point in the set of points is mapped to a particular road segment in the map. These continuous road segments form a route matching the trajectory. Correspondingly, a length of the route between the start point and the end point may be computed as the trajectory distance between the start point and the end point. In other words, in such an embodiment, the trajectory distance between the start point and the end point is the map matching distance there between.

Alternatively or additionally, in an embodiment, a polyline distance between the start point and the end point is be directly computed at step S210 as the trajectory distance. Specifically, direct-line distances of adjacent points in the set of points on the map may be computed one by one along the trajectory, beginning from the start point, till the end point in the set of points. By accumulating these distances, the polygonal distance between the start point and the end point may be determined. Note, in the context of the present disclosure, a direct line is regarded as a particular type of polyline.

Next, the method 200 proceeds to step S220, where a route distance on the map between the start point and the end point is computed. Based on the locations of the start point and the end point represented on the map, and based on the information provided the road network of the map, one or more routes from the start point to the end point can be determined. In particular, if the start point and/or end point does not completely fall on the road segment on the map, points on the road segment which most match the start point and/or end point may be used as approximates.

In an embodiment, at step S220, a length of the shortest route between the start point and the end point may be computed as the route distance, the manner of seeking the shortest route is known in the art. For example, the Dijkstra algorithm may be used to determine the shortest route connecting the start point and the end point on the map, and then the length of the route is determined as the route distance.

Besides the shortest route distance, in an embodiments, at step S220, another route between the start point and the end point may be selected based on any appropriate factors, and then the length of the route is determined as the route distance. Examples of these factors include, but are not limited to, one or more of the following: type of road segments (e.g., one-way road, express road, highway, etc.), condition of the road segment (e.g., number of lanes, whether there is a road segment under construction, etc.), real-time traffic of the road, route preference of the user, etc.

Next, the method 200 proceeds to step S230, where the trajectory distance determined at step S210 and the route distance determined at step S220 are compared to verify the road network of the map, i.e., checking whether potential errors are present in the road network. Hereinafter, two exemplary embodiments of the step S230 will be described infra with reference to FIG. 3 and FIG. 4, respectively.

Figure 3:
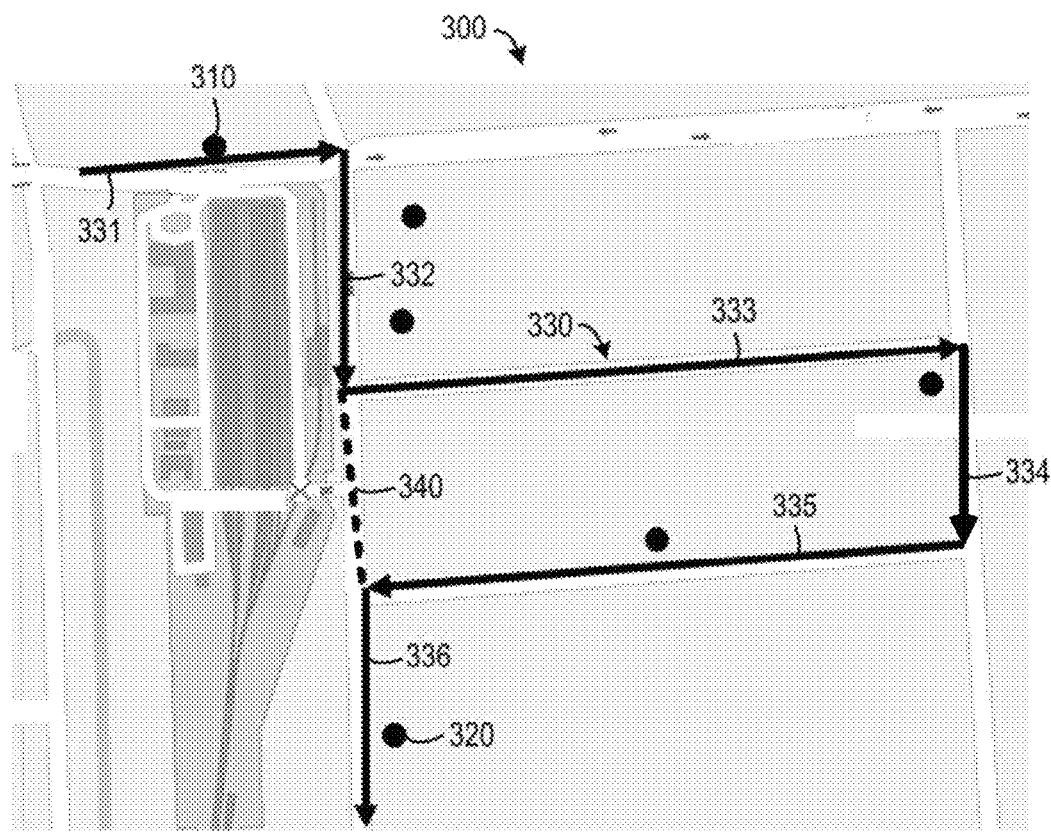
FIG. 3 shows a schematic diagram of checking a road segment connectivity error in a road network of a map according to an embodiment of the present invention.

FIG. 3 illustrates checking whether a road segment connectivity error is present in a road network of a map 300. As above mentioned, the road segment connectivity error means the road segment connection relationship on the map does not conform to the real world road segment. For example, one or more road segments on the map do not exist in the real world at all. In the example of FIG. 3, the trajectory distance between the start point 310 and the end point 320 in the set of points is the length of the matching route. Specifically, in this example, points in the point of sets are mapped to a route 330 on the map. As shown in the figure, the route 330 includes road segments 331-336.

In an embodiment, matching points of the start point 310 and the end point 320 are determined respectively. Then, the length of the route 330 between the two matching points may be computed as the trajectory distance between the start point 310 and the end point 320.

In addition, the route distance between the start point 310 and the end point 320 in the map 300 will also be determined. Specifically, in this example, the shortest route distance between the start point 310 and the end point 320 is computed. Given two points on the map and the road network information of the map, any currently existing or future developed methods may be used to calculate the shortest route distance between the two points.

Next, based on the trajectory distance and the shortest route distance, a detour coefficient between the start point 310 and the end point 320 may be computed. The term "detour coefficient" used here represents the relationship between the trajectory distance and the shortest route distance between the start point and the end point. For example, in an embodiment, the detour coefficient represents a ratio between the trajectory distance and the shortest route distance. For example, the ratio between the trajectory distance and the shortest route distance may be directly used as the detour coefficient. In another embodiment, other operations (e.g., solving log, solving exponent, etc.) can also be performed to the trajectory distance, shortest route distance and/or their ratio, so as to compute the detour coefficient.

According to an embodiment of the present invention, if the detour coefficient between the start point 310 and the end point 320 is too large (e.g., exceeding a predetermined threshold greater than 1), it may indicate that the actual length of the trajectory represented by the set of points is far greater than the shortest route distance between the start point and the end point indicated in the road network of the map. In this case, it may be regarded that there likely exists a road segment having a potential connectivity error between the start point 310 and the end point 320.

The logic for such a determination lies in that if a shorter route indicated in the road network does exist in the real world, then the vehicle or user would generally select the shorter segment to travel from the start point to the end point, rather than a detour. On the contrary, if the trajectory of the user in the real world is indeed far greater than the shortest path indicated in the road network, then one or more road segments in the shortest road very likely do not exist in the real world.

Specifically consider the example of FIG. 3. Suppose the road network of the map 300 indicates a presence of a road segment 340. Accordingly, in this example, the shortest route from the start point 310 to the end point 320 includes the road segment 340. However, the actual trajectory represented by the set of points advances along road segments 333, 334, and 335 instead, such that the trajectory distance is apparently greater than the shortest path distance indicated by the road network. In this way, it may be determined that the road segment 340 might not exist in the real world. In other words, road segment 340 is a road segment having a connectivity error.

In an embodiment, after determining that a potential error (which is road segment connectivity error in this example) exists between the start point 310 and the end point 320 in response to a too large detour coefficient, a range of the potential error on the map may be estimated by adjusting the set of points. For example, in an embodiment, a point after the start point 310 in the set of points may be selected as a new start point, and/or a point before the end point 320 in the set of points may be selected as a new end point, repeating steps S210 to S230, till between which two points the potential road segment connectivity error is located is determined.

Figure 4:
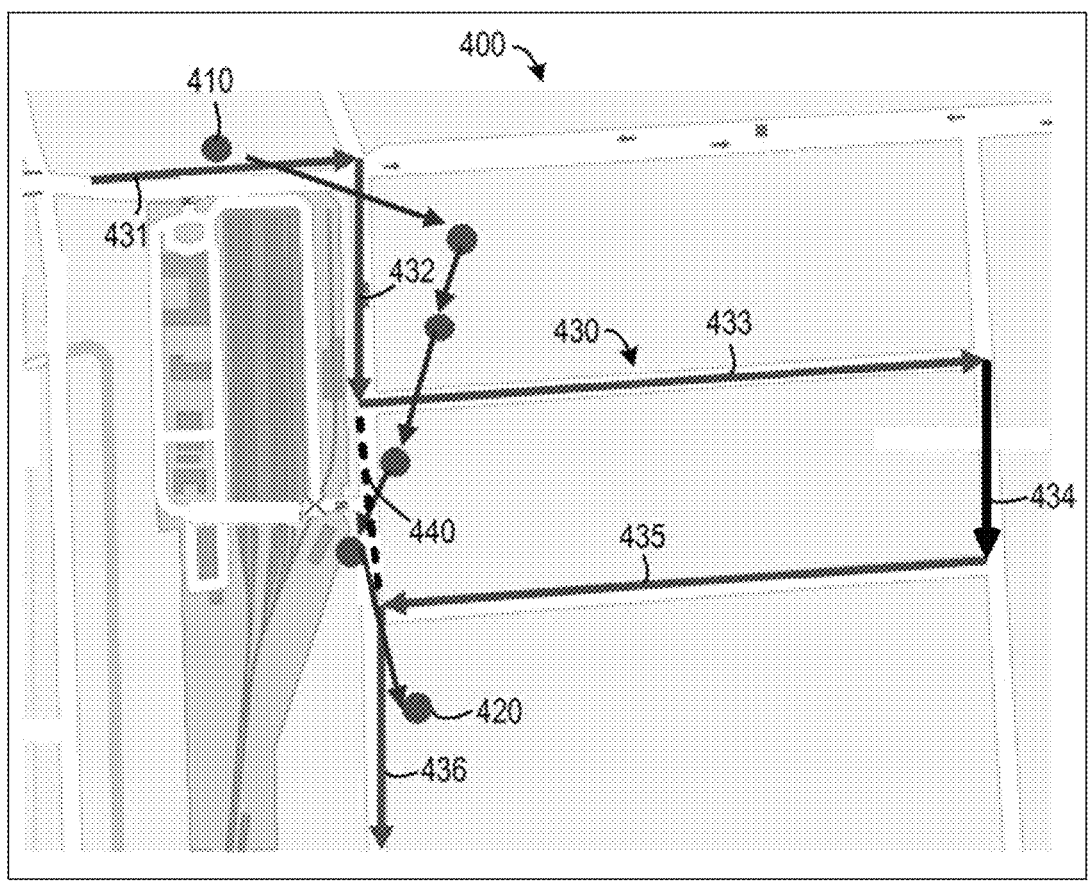
FIG. 4 shows a schematic diagram of checking a missing road segment in a road network of a map according to an embodiment of the present invention.

FIG. 4 shows another embodiment of verifying a road network of a map. More specifically, in the example of FIG. 4, it may be verified whether potential road segment missing occurs in a road network of a map 400.

In this example, a polyline between a start point 410 and an end point 420 in the set of points is computed as the trajectory distance between the two in the map 400. Specifically, beginning from the start point 410, in a sequence along the trajectory corresponding to the set of points, map distances between adjacent points in the set of points are computed one by one. By accumulating these distances, the polyline distance between the start point 410 and the end point 420 may be obtained as the trajectory distance.

Similar to the example of FIG. 3, in the example of FIG. 4, the shortest distance between the start point 410 and the end point 420 may be computed as the route distance between the two. Specifically, in this example, suppose the shortest route between the start point 410 and the end point 420 in the road network is route 430 including road segments 431-436. Accordingly, the distance of the route 430 between the start point 410 and the end point 420 is used as the route distance.

Based on the trajectory distance and the shortest route distance between the start point 410 and the end point 420, a detour coefficient between the start point 410 and the end point 420 may be computed. In this example, for example, the detour coefficient is still computed as a ratio between the trajectory distance (which is polyline distance now) and the shortest route distance. In such an embodiment, if the computed detour coefficient is too small (e.g., smaller than a predetermined threshold less than 1), it indicates that the actual trajectory distance is apparently smaller than the computed shortest route distance in the road network. Therefore, it may be regarded that a potential road segment missing is present in the map 400.

The logic underlining such determination is that: if all road segments in the real world are covered in the road network of the map, the actual trajectory distance between the start point and the end point should not be significantly smaller than the shortest route distance between the starting point and the end point in the road network. On the contrary, if such a condition occurs, i.e., the trajectory distance is apparently smaller than the shortest route distance, it indicates that some road segments existing in the real world are very likely not correctly reflected in the road network of the map, i.e, the road network has potential road segment missing.

Specifically consider the example of FIG. 4, road segment 440 might be a missing road segment. In other words, the road segment 440 is present in the real world, but not correctly reflected in the road network of the map. In this case, when computing the shortest route based on the road network information, road segments 433, 434, and 435 will be chosen. As a result, the shortest route distance computed based on the road network information is significantly greater than the trajectory distance.

Similar to the example of FIG. 3, in the example shown in FIG. 4, once the road network of the map 400 is verified to have a potential error (in this example, it is road segment missing), a range of the potential error on the map may be further estimated by adjusting the set of points. For example, in one embodiment, detour coefficients between the start point and respective other points in the set of points may be computed, finding a point with a sudden change of detour coefficient, thereby locating a possible range with road segment missing.

It should be noted that the methods of computing the trajectory distance as depicted above with reference to FIGS. 3 and 4 may be used in exchange or in combination. For example, a polyline distance between the start point and the end point can be computed as the trajectory distance, and it is possible to determine whether the road network has a potential road segment connectivity error based on the ratio between the trajectory distance and a route distance. Moreover, any other appropriate manner of determining the trajectory distance is also feasible, and the scope of the present invention is not limited in this aspect.

Returning to FIG. 2, according to an embodiment of the present invention, at step S230, it may be verified whether the road network of the map has either or both of the road segment connectivity error and the road segment missing. Of course, other possible errors in the road network may also be checked based on the trajectory distance and the route distance. The shortest route distance as described in the above examples is only for the purpose of illustration. Dependent on different computation manners of the detour coefficient, the longest route distance or any other appropriate distance between the start point and the end point may be computed, to compare with the trajectory distance.

Through the depictions above, at step S230, the trajectory distance and the route distance between the start point and the end point may be compared to verify whether the road network of the map has a potential error. In an embodiment, when such potential error is detected, it may be prompted to the user and/or a corresponding correction procedure may be invoked. The method 200 may end after step S230.

Alternatively, in an alternative embodiment, the method 200 proceeds to step S240, where other trajectories are used to repeat the verification process from steps S210 to S230, so as to confirm whether the road network does have a potential error, thereby enhancing the credibility of the verification. Specifically, suppose the map is verified to have a potential error such as a potential road segment connectivity error and/or road segment missing at step S230. In this case, at step S240, at least one further trajectory within relevant area of the map and corresponding to at least one further set of points may be obtained. For example, in an embodiment, the selected further set of points may include the start point and/or end point as previously processed or a point nearby. Location data corresponding to such a set of points may be collected by a positioning device of other vehicle or user traveling along a corresponding trajectory. These additional set of points may be used to repeat the road network verification procedure from step S210 to step S230.

In this way, error check caused by some exceptions can be reduced. For example, consider the example of FIG. 3. If the detour coefficient of one trajectory is far greater than 1, the possibility cannot be excluded that road segment 340 does exist. For example, the vehicle or user likely intentionally detoured along road segments 333, 334 and 335 due to special reasons, without travelling along the road segment 340. In this case, detour coefficients may be computed for multiple times using the sets of points corresponding to one or more trajectories from the start point 310 and the end point 320. If most detour coefficients are greater than 1, it may be determined more reliably that the road segment 340 is very likely an over-connected road segment that does not exist.

Alternatively or additionally, in an embodiments, the method 200 proceeds to step S250, where a result of map verification is confirmed using other trusted road network(s). The trusted road network is one that has been verified to include correct road segment information. For example, in an embodiment, the trusted road network is provided by a commercial map. Alternatively, the trusted road network may be input or designated by the user.

Specifically, at step S250, the set of points may be mapped to the trusted road network, and the route distance between the start point and the end point in the trusted road network is determined as "trusted route distance." As an example, the shortest route distance between the start point and the end point in the trusted road network may be calculated as "trusted shortest route distance." Additionally, the shortest route distance between the start point and the end point in the road network of the distance under verification may be calculated and compared with the trusted shortest route distance. If the difference derived from the comparison is greater than the predetermined threshold, it may be confirmed that the road network of the map under verification indeed has an error. In this case, it may be prompted to the user and/or the road network of the map under verification may be corrected based on the trusted road network.

It should be noted that the sequences of respective steps in FIG. 2 are only schematic. For example, determining the trajectory distance at step S210 and the shortest route distance at step S220 may be performed in a reverse order or in parallel. For another example, determinations at steps S240 and S259 can also be performed according to any appropriate order.

Figure 5:
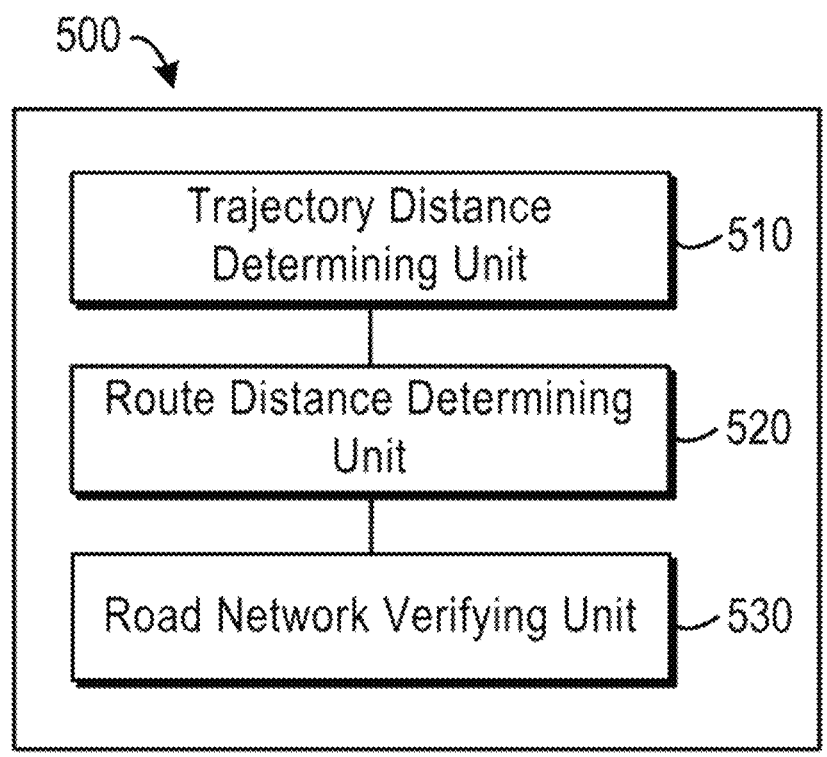
FIG. 5 shows a schematic block diagram of a system for verifying a road network of a map according to an embodiment of the present invention.

FIG. 5 shows a schematic block diagram of a system 500 for verifying a road network of a map according to an embodiment of the present invention. As shown in the figure, the system 500 includes a trajectory distance determining unit 510 configured to determine, based on locations of a set of points in the map, a trajectory distance of a trajectory between a start point and an end point in the set of points on the map; a route path determining unit 520 configured to determine a route distance between the start point and the end point in the road network of the map; and a road network verifying unit 530 configured to verify the road network by comparing the trajectory distance and the route distance.

In an embodiment, the set of points is obtained by mapping sensed location data on the map using map matching. In this embodiment, the system 500 includes a point selecting unit configured to select at least one of the start point and the end point from the set of points based on matching degrees between the set of points and road segments in the road network.

In an embodiment, the trajectory distance determining unit 510 includes a matching route determining unit configured to determine a route in the road network that matches the trajectory; and a route distance determining unit configured to determine a route distance of the route between the start point and the end point, as the trajectory distance. In this embodiment, the road network verifying unit 530 includes a connectivity error detecting unit configured to determine, in response to a ratio between the trajectory distance and the route distance being greater than a predetermined threshold, that the road network has a potential road segment connectivity error.

Alternatively or additionally, in an embodiment, the trajectory distance determining unit 510 includes a polyline distance determining unit configured to determine, as the trajectory distance, a polyline distance between the start point and the end point on the map by accumulating distances between adjacent points in the set of points along the trajectory on the map. In this embodiment, the road network verifying unit may include a road segment missing detecting unit configured to determine, in response to a ratio between the trajectory distance and the route distance being less than a predetermined threshold, that the road network has a potential road segment missing.

In an embodiment, the system 500 may also include an error range determining unit configured to determine, in response to the road network being verified to have a potential error, a range of the potential error on the map by adjusting the set of points.

In an embodiment, the system 500 may further include a first confirming unit configured to repeat, in response to the road network being verified to have a potential error, the verifying of the road network using at least one further trajectory corresponding to at least one further set of points on the map, to confirm the potential error in the road network.

In an embodiment, the system 500 may also include a trusted distance determining unit configured to determine, in response to the road network being verified to have a potential error, a trusted route distance between the start point and the end point in the road network; a distance comparing unit configured to compare the route distance and the trusted route distance, and a second confirming unit configured to confirm the potential error in the road network of the map based on the comparing.

It should be noted that for the sake of clarity, FIG. 5 does not show optional units or sub-units included in the system 500. All features and operations as described above are suitable for system 500, respectively, which are therefore not detailed here. Moreover, partitioning of units or subunits in system 500 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the system 500 may be implemented by various manners, including software, hardware, firmware or a random combination thereof. For example, in some embodiments, the apparatus may be implemented by software and/or firmware. Alternatively or additionally, the system 500 may be implemented partially or completely based on hardware. for example, one or more units in the system 500 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer implemented method for verifying a road network of a map, the method comprising:
   determining, by a trajectory distance determining unit, based on locations of a set of points in the map, a trajectory distance of a trajectory between a start point and an end point in the set of points on the map, wherein the set of points is obtained by mapping sensed location data on the map using map matching, wherein the sensed location data is collected via a positioning device of the user during travel of the user,
   wherein determining the trajectory distance further comprises determining a polyline distance determining unit configured to determine, as the trajectory distance, a polyline distance between the start point and the end point on the map by accumulating distances between adjacent points in the set of points along the trajectory on the map, wherein the locations of the set of points in the map are sensed using a positioning device;
   determining a route distance between the start point and the end point in the road network of the map;
   verifying the road network by comparing the trajectory distance to the route distance;
   identifying an error in the road network of the map by calculating a detour coefficient is greater than a predetermined threshold, wherein the detour coefficient is based on a ratio between the trajectory distance and the route distance between the start point and the end point;
   confirming results of verifying the road network by comparing a shortest route distance between the start point and the end point of the road network to a trusted shortest route distance of a trusted road network;
   comparing the error with a second confirming unit; and
   prompting a user of the error in the road network of the map, based on the comparison of the shortest route distance to the trusted shortest route distance.

2. The computer implemented method according to claim 1, wherein verifying the road network by comparing the trajectory distance and the route distance comprises:
   in response to a ratio between the trajectory distance and the route distance being less than a predetermined threshold, determining that the road network has a potential road segment missing.

3. The computer implemented method according to claim 1, wherein verifying the road network by comparing the trajectory distance and the route distance comprises:
   in response to a ratio between the trajectory distance and the route distance being greater than a predetermined threshold, determining that the road network has a potential road segment connectivity error.

4. The computer implemented method according to claim 1, further comprising:
   determining, in response to the road network being verified to have a potential error, a range of the potential error on the map by adjusting the set of points.

5. The computer implemented method according to claim 1, further comprising:
   repeating, in response to the road network being verified to have a potential error, the verifying of the road network using at least one further trajectory corresponding to at least one further set of points on the map to confirm the potential error in the road network.

6. The computer implemented method according to claim 1, further comprising:
   determining, in response to the road network being verified to have a potential error, a trusted route distance between the start point and the end point in the road network;
   comparing the route distance and the trusted route distance; and
   confirming the potential error in the road network of the map based on the comparison.

7. A computer program product for verifying a road network of a map, the method comprising:
   one or more computer-readable storage media and program instructions stored on the one or more computer-readable storage media, the program instructions comprising:
   program instructions to determine, based on locations of a set of points in the map, a trajectory distance of a trajectory between a start point and an end point in the set of points on the map, wherein the set of points is obtained by mapping sensed location data on the map using map matching, wherein the sensed location data is collected via a positioning device of the user during travel of the user,
   and wherein the program instructions to determine the trajectory distance further comprises program instructions to determine as the trajectory distance, a polyline distance between the start point and the end point on the map by accumulating distances between adjacent points in the set of points along the trajectory on the map, wherein the locations of the set of points in the map are sensed using a positioning device;
   program instructions to determine a route distance between the start point and the end point in the road network of the map;
   program instructions to verify the road network by comparing the trajectory distance to the route distance;

program instruction to identify an error in the road network of the map of calculating a detour coefficient is greater than a predetermined threshold, wherein the detour coefficient is based on a ratio between the trajectory distance and the route distance between the start point and the end point;

program instructions to confirm results of verifying the road network by comparing a shortest route distance between the start point and the end point of the road network to a trusted shortest route distance of a trusted road network;

comparing the error with a second confirming unit; and program instructions to prompt a user of the error in the road network of the map, based on the comparison of the shortest route distance to the trusted shortest route distance.

8. The computer program product according to claim 7, wherein the program instructions to verify the road network by comparing the trajectory distance and the route distance comprises:

in response to a ratio between the trajectory distance and the route distance being less than a predetermined threshold, program instructions to determine that the road network has a potential road segment missing.

9. The computer program product according to claim 7, wherein the program instructions to verify the road network by comparing the trajectory distance and the route distance comprises:

in response to a ratio between the trajectory distance and the route distance being greater than a predetermined threshold, program instructions to determine that the road network has a potential road segment connectivity error.

10. The computer program product according to claim 7, further comprising:

program instructions to determine, in response to the road network being verified to have a potential error, a range of the potential error on the map by adjusting the set of points.

11. The computer program product according to claim 7, further comprising:

program instructions to repeat, in response to the road network being verified to have a potential error, the verifying of the road network using at least one further trajectory corresponding to at least one further set of points on the map to confirm the potential error in the road network.

12. The computer program product according to claim 7, further comprising:

program instructions to determine, in response to the road network being verified to have a potential error, a trusted route distance between the start point and the end point in the road network;

program instructions to compare the route distance and the trusted route distance; and program instructions to confirm the potential error in the road network of the map based on the comparison.

13. A computer system for verifying a road network of a map, the computer system comprising:

one or more computer processors, one or more computer-readable storage media, and program instructions stored on one or more of the computer-readable storage media for execution by at least one of the one or more processors, the program instructions comprising:

program instructions to determine, based on locations of a set of points in the map, a trajectory distance of a trajectory between a start point and an end point in the set of points on the map, wherein the set of points is obtained by mapping sensed location data on the map using map matching, wherein the sensed location data is collected via a positioning device of the user during travel of the user, and wherein the program instructions to determine the trajectory distance further comprise program instructions to determine as the trajectory distance, a polyline distance between the start point and the end point on the map by accumulating distances between adjacent points in the set of points along the trajectory on the map, wherein the locations of the set of points in the map are sensed using a positioning device;

program instructions to determine a route distance between the start point and the end point in the road network of the map;

program instruction to identify an error in the road network of the map by calculating a detour coefficient is greater than a predetermined threshold, wherein the detour coefficient is based on a ratio between the trajectory distance and the route distance between the start point and the end point;

program instructions to verify the road network by comparing the trajectory distance to the route distance;

program instruction to confirm results of verifying the road network by comparing a shortest route distance between the start point and the end point of the road network to a trusted shortest route distance of a trusted road network;

comparing the error with a second confirming unit; and program instruction to prompt a user of an error in the road network of the map, based on the comparison of the shortest route distance to the trusted shortest route distance.

14. The computer system according to claim 13, wherein the program instructions to verify the road network by comparing the trajectory distance and the route distance comprises:

in response to a ratio between the trajectory distance and the route distance being less than a predetermined threshold, program instructions to determine that the road network has a potential road segment missing.

15. The computer system according to claim 13, wherein the program instructions to verify the road network by comparing the trajectory distance and the route distance comprises:

in response to a ratio between the trajectory distance and the route distance being greater than a predetermined threshold, program instructions to determine that the road network has a potential road segment connectivity error.

16. The computer system according to claim 13, further comprising:

program instructions to determine, in response to the road network being verified to have a potential error, a range of the potential error on the map by adjusting the set of points.

17. The computer system according to claim 13, further comprising:

program instructions to repeat, in response to the road network being verified to have a potential error, the verifying of the road network using at least one further trajectory corresponding to at least one further set of points on the map to confirm the potential error in the road network.

18. The computer system according to claim 13, further comprising:

program instructions to determine, in response to the road network being verified to have a potential error, a trusted route distance between the start point and the end point in the road network;
program instructions to compare the route distance and the trusted route distance; and
program instructions to confirm the potential error in the road network of the map based on the comparison.

* * * * *